United States Patent
Muller et al.

[11] Patent Number: 5,851,469
[45] Date of Patent: Dec. 22, 1998

[54] PROCESS FOR MAKING A WOOD-THERMOPLASTIC COMPOSITE

[75] Inventors: John J. Muller, Winchester, Va.; Roger A. Wittenberg, Newtown, Pa.

[73] Assignee: Trex Company, L.L.C., Winchester, Va.

[21] Appl. No.: 940,397

[22] Filed: Oct. 1, 1997

Related U.S. Application Data

[63] Continuation of Ser. No. 579,111, Dec. 27, 1995, abandoned.

[51] Int. Cl.$^6$ .......................... B29C 47/88; B29C 47/90
[52] U.S. Cl. ............................ 264/177.1; 264/177.19; 264/211.11; 264/211.13; 264/237
[58] Field of Search .................... 264/177.11, 177.19, 264/211, 211.11, 211.13, 237

[56] References Cited

U.S. PATENT DOCUMENTS

| | | | |
|---|---|---|---|
| 2,833,633 | 5/1958 | Hecht | 264/211.11 X |
| 3,888,810 | 6/1975 | Shinomura | 524/13 |
| 4,056,591 | 11/1977 | Goettler et al. | 264/108 |
| 4,225,640 | 9/1980 | Erb | 428/2 |
| 4,228,116 | 10/1980 | Colombo et al. | 264/119 |
| 4,505,869 | 3/1985 | Nishibori | 264/211 X |
| 4,791,020 | 12/1988 | Kokta | 428/326 |
| 4,968,463 | 11/1990 | Levasseur | 264/40.1 |
| 5,082,605 | 1/1992 | Brooks et al. | 264/40.6 |
| 5,088,910 | 2/1992 | Goforth et al. | 425/142 |
| 5,217,655 | 6/1993 | Schmidt | 264/471 |
| 5,759,680 | 6/1998 | Brooks et al. | 428/326 |

FOREIGN PATENT DOCUMENTS

| | | |
|---|---|---|
| 149481 | 7/1981 | Germany. |
| 56-46736 | 4/1981 | Japan. |

OTHER PUBLICATIONS

Decision of the Court of Appeals for the Federal Circuit, 1996 U.S. App. Lexis 14274.

Decision of the Court of Appeals for the Federal Circuit, 93 F.3d 1203 (Jun. 13, 1996).

*Primary Examiner*—Leo B. Tentoni
*Attorney, Agent, or Firm*—Rhodes Coats & Bennett, L.L.P.

[57] ABSTRACT

The invention relates to a method for making a dimensionally stable wood-thermoplastic composite material composed of a wood component and a thermoplastic component comprising the steps of forming a wood-thermoplastic mass at a temperature above the melting temperature of the thermoplastic component. The mass is then passed through a converging die to form a shaped extrudate profile having a cross sectional shape wherein at least a part of the converging die is maintained at a substantially higher temperature than that of the mass. The profile is then fed through a low friction thermally insulating land section, the land section having the substantially the same cross sectional shape as the exit end of the converging die. The profile is then quenched in a non-oxidizing environment to form a substantially dimensionally stable outer shell around the profile, the shell having a temperature below the melting temperature of the thermoplastic component. The invention also relates to a die assembly for making a wood-thermoplastic composite material.

40 Claims, 5 Drawing Sheets

PROCESS FOR MAKING A WOOD-THERMOPLASTIC COMPOSITE

This application is a continuation of application Ser. No. 08/579,111 filed Dec. 27, 1995, now abandoned.

FIELD OF THE INVENTION

The present invention relates to a die assembly and a method for extruding a wood-thermoplastic composite material with improved dimensional stability.

BACKGROUND OF THE INVENTION

Composite materials consisting of a mixture of wood particles in the form of sawdust and a thermoplastic material have been known for many years. The materials so formed may be used in many of the same applications as an all wood product but offer the advantages of providing high resistance to rot, insects and moisture. These products can have the same workability as wood and are splinter-free. However, these materials do not exhibit the same physical characteristics as wood and therefore may not be used as structural members in some applications. The recent past has seen increased interest in composite material manufacture as a viable outlet for recycled post consumer thermoplastic materials. This interest has been spurred by the prospect of environmental regulations mandating the recycling of these materials. Also valuable, ever-shrinking landfill space may be conserved if both spent sawdust and plastic material are reused rather than disposed.

Forming a wood-polymer composite into a final product has been accomplished using some of the techniques used for forming all polymer products, including extrusion. While the technology for extruding all polymer products is well-developed with fairly predictable results, the extrusion of a wood-thermoplastic composite material using recycled input materials is subject to much wider variance in the molecular makeup and physical characteristics of the input materials, depending on available sources of recycled material. Moreover, a wood-thermoplastic composite has unique melt flow characteristics, which prevent the literal translation of polymer extrusion techniques for use in composite material extrusion. The present invention is concerned with a die assembly and an associated extrusion method for obtaining improved dimensional stability of an extruded wood-thermoplastic profile. A profile is defined in this art as an article fabricated from the composite material, which has a variable length and consistent cross section. As used herein, the term dimensional stability refers to the tendency of a finished profile of a wood-thermoplastic composite material to hold to predetermined cross-sectional dimensions along its entire length.

There are particular problems encountered with wood-thermoplastic profile extrusion that make control of the dimensional stability of the final product difficult. First, it is well known in thermoplastic extrusion that extrusion equipment and operating conditions must be closely matched to the material being extruded. For example, attempting to extrude a given thermoplastic such as polyethylene in equipment designed for a different type of thermoplastic such as polypropylene will give extremely unsatisfactory results. In contrast, the same extruder is used to make a composite product utilizing a wide range of thermoplastic input materials in the practice of the present invention. When fabricating a composite product using recycled thermoplastic input material, the nature of the thermoplastic material may change from one minute to the next requiring changes to process controls. The process can be unstable.

A second problem is the presence of volatiles in the wood component. Volatiles in the wood-thermoplastic mixture are heated in the extruder barrel and attempt to escape as the profile exits the die. This effect is referred to as foaming and can result in severe dimensional distortion (sagging, bending, bunching or stretching) of the profile. The kinds of volatiles that can be found in a wood-thermoplastic mixture typically include ordinary moisture and wood lignin, and terpenes. Another problem arises from the portion of the wood component that is near the surface of the profile exiting the extruder. At the profile's high temperature, the wood component can oxidize as it is exposed to air, creating a burned appearance on the final product.

Underlying and to some extent magnifying these problems is the tendency of any extruded material to experience a phenomenon called die swell. Die swell is the tendency of an extrudate to swell as it leaves the die due to the release of shear stresses built up in the extrudate as it travels along the extruder barrel and die surfaces. Shear stress develops between the extrudate the die wall causing tears and roughness in the finished surface of the profile in addition to die swell. In ordinary polymer extrusion the shape of the opening at the die exit may have to be changed dramatically from the desired final shape in order to account for extrudate swelling.

Calibration processes have been developed for thermoplastics extrusion to ensure that the extrudate emerging from a die maintains a certain shape. Some of these techniques are described in *Polymer Extrusion*, C. Rauwendaal, (2d reprinted ed., 1990) at pp. 448–450. Calibration typically involves the use of some type of cooled sizing die to fix the shape of the extrudate. Calibration of thermoplastic extrudates typically requires exerting tension variable force on the extrudate to literally pull it through the calibration device. This approach is unworkable for the present invention because a wood-thermoplastic melt lacks sufficient melt strength to undergo appropriate tension. The extrudate of the present invention must be pushed through the die assembly and requires a different approach to ensure dimensional stability.

Various techniques are known for extruding wood-thermoplastic composite materials. U.S. Pat. No. 4,968,463 to Levasseur (the '363 patent) discloses a process for producing extruded or molded objects from waste containing plastic materials. The process includes the steps of preliminary physical treatment, drying if the water content of the initial materials is over about 8% by weight, preheating to a temperature of 80° C. to 160° C. (176° F. to 320° F.), mixing or kneading at a temperature of 120° C. to 250° C. (248° F. to 482° F.) to form a paste, and injection molding or extrusion. The process also contemplates the addition of coloring and/or filling agents such as compost refuse, incineration plant cinders, old paper, ground rags or fines from household waste after the drying step. Levasseur also discloses the use of a water-cooled casing immediately after the die to cool the profile.

U.S. Pat. No. 5,217,655 to Schmidt discloses a process for preparing a composite product from an intake material incorporating commercial, municipal or industrial waste containing organic, plastic and fibrous material. The intake material is first granulated and sized and is then heated in three consecutive stages. The material is continuously mixed during the heating stages and reaches a final temperature of about 160° to 204° C. (320° to 400° F.). The heating and mixing steps are carried out under very high pressures to ensure encapsulation of the filler material by the plastic fraction. These high pressures are stated to range from about 141 to about 492 kg/cm² (2,000–7,000 psi). The material may then be co-extruded with a reinforcement structure and formed into a final product using vacuum profile dies or compression molding. The patent discloses mist spray cooling tanks as a preferred method of cooling the final product.

U.S. Pat. No. 5,082,605 to Brooks et al. discloses a method for making a composite material comprising a discontinuous phase of cellulosic fiber encapsulated in a polymeric matrix. The method requires that cellulosic fiber and polymeric material-be mixed while simultaneously being heated to an encapsulation point. The mixture consists of a discontinuous phase of cellulosic fibers encapsulated in a polymeric continuous phase. The mixture is then reduced mechanically into smaller golf ball sized particles having a maximum dimension of about 3.8 cm (1.5 in). The resulting particles are then extruded into a homogenous mass while maintaining the particle temperature within the encapsulation range. The homogenous mass is then forced through an alignment plate to substantially align fibers in a flow direction and then through an extrusion die to form a composite extrudate.

U.S. Pat. No. 4,225,640 to Erb discloses a method for reclaiming thermoplastic material from municipal waste. The thermoplastic material is first separated from the municipal waste and is decimated into fragments of a particular size. In similar fashion fallen leaves are separated from other municipal waste and are shredded to a predetermined size. The size to which both components are decimated is measured by the ability of the fragments to pass through a particular mesh opening. The fragments of thermoplastic material and leaf material are then mixed thoroughly and subject to sufficient heat and pressure so that the thermoplastic material coats and bonds to the surfaces of the leaf fragments. The unitary mass so formed is then permitted to set and cure so as to be formed into any desired shape. The patent discloses that a preferred shape is the form of particle boards of standard size. The patent also discloses that the unitary mass may be extruded to form finished articles. The flow of-the mixture through the extruder is preferably controlled to provide a desired orientation of the leaf fragments as they flow therethrough.

Despite the presence of these prior art processes, it remains a challenge to consistently and accurately fix the dimensions of a continuously extruded profile composed of a wood-thermoplastic composite material.

SUMMARY OF THE INVENTION

The present invention overcomes the disadvantages of the prior art by providing a die assembly and method for making a dimensionally stable wood-thermoplastic composite material of constant quality despite using input materials of varying quality and makeup. The invention relates to a die assembly for making a wood-thermoplastic composite article comprising a converging die means for forming an extrudate profile of a desired cross sectional shape, the die means having an entrance end and an exit end; a low friction insulating land section secured to the exit end of the converging section and adapted to receive the profile through a land section passage, wherein the land section passage has a cross sectional shape substantially similar to the cross sectional shape of the die means exit end and a low friction surface in contact with the extrudate; and an enclosed cooling section secured to the low friction land section comprising: i) a cooling medium inlet section having a passage adapted to receive the profile, ii) at least one cooling medium channel disposed within the inlet section, the cooling medium channel extending radially from the inlet section passage, and an enclosed cooling flume secured to the cooling medium inlet section and having a flume passage therethrough, wherein the flume passage is in communication with the cooling medium inlet section passage. The cooling medium inlet section may further include a plurality of cooling medium channels in communication with the cooling medium inlet section passage.

The present invention also relates to a method for making a dimensionally stable wood-thermoplastic composite material composed of a wood component and a thermoplastic component comprising the steps of: a)forming a wood-thermoplastic mass, the mass being at a temperature above the melting temperature of the thermoplastic component; b) passing the mass through a converging die to form a shaped extrudate profile having a cross sectional shape; wherein at least a part of the converging die is maintained at a substantially higher temperature than that of the mass, c) feeding the profile through a low friction thermally insulating land section, the land section having a cross sectional shape substantially similar to the cross sectional shape of the exit end of the converging die; and d) quenching the profile in a non-oxidizing fluid to form a substantially dimensionally stable outer shell around the profile, the shell having a temperature below the melting temperature of the thermoplastic component. The quenching step may be accomplished by contacting the profile with a cooling medium in a cooling means, the cooling means including: a) a cooling medium inlet section having a passage therethrough, the passage adapted to receive the profile, b) at least one cooling medium channel disposed within the inlet section, the cooling medium channel extending radially from the inlet section passage, c) an enclosed flume secured to the cooling medium inlet section and having a flume passage therethrough, the flume passage having an interior surface, wherein the flume passage is in communication with the cooling medium inlet section passage; and d) a cooling medium annulus defined between the flume passage interior surface and the profile.

It is therefore an object of the present invention to provide an economical process for making a dimensionally stable wood-thermoplastic composite material.

It is another object of the present invention to provide a die assembly having a low friction land section which separates a hot converging die section from a cooling section adapted to quench a hot wood-thermoplastic profile.

Still another object of the present invention is to provide a method for quenching a hot, wood-thermoplastic composite material profile in a non-oxidizing environment so as to prevent a burned appearance on the surface of the finished composite.

Still another object of the present invention is to provide an extrusion method that allows an extrusion die to operate at very high temperatures adjacent to a cooling section that quenches a profile at very low temperatures to produce a finished product having much improved surface quality.

Yet another object of the present invention is to provide a wood-thermoplastic composite method that is highly tolerant of momentary melt flow stoppages.

It should be understood that both the foregoing general description and the following detailed description are exemplary and explanatory only and are not restrictive of the invention as claimed.

The accompanying drawings, which are incorporated in and constitute a part of this specification, illustrate one embodiment of the invention and, together with the description, serve to explain the principles of the invention.

DETAILED DESCRIPTION OF THE INVENTION

Reference will now be made in detail to a present-preferred embodiment of the invention, an example of which is illustrated in the accompanying drawings.

Figure 1:
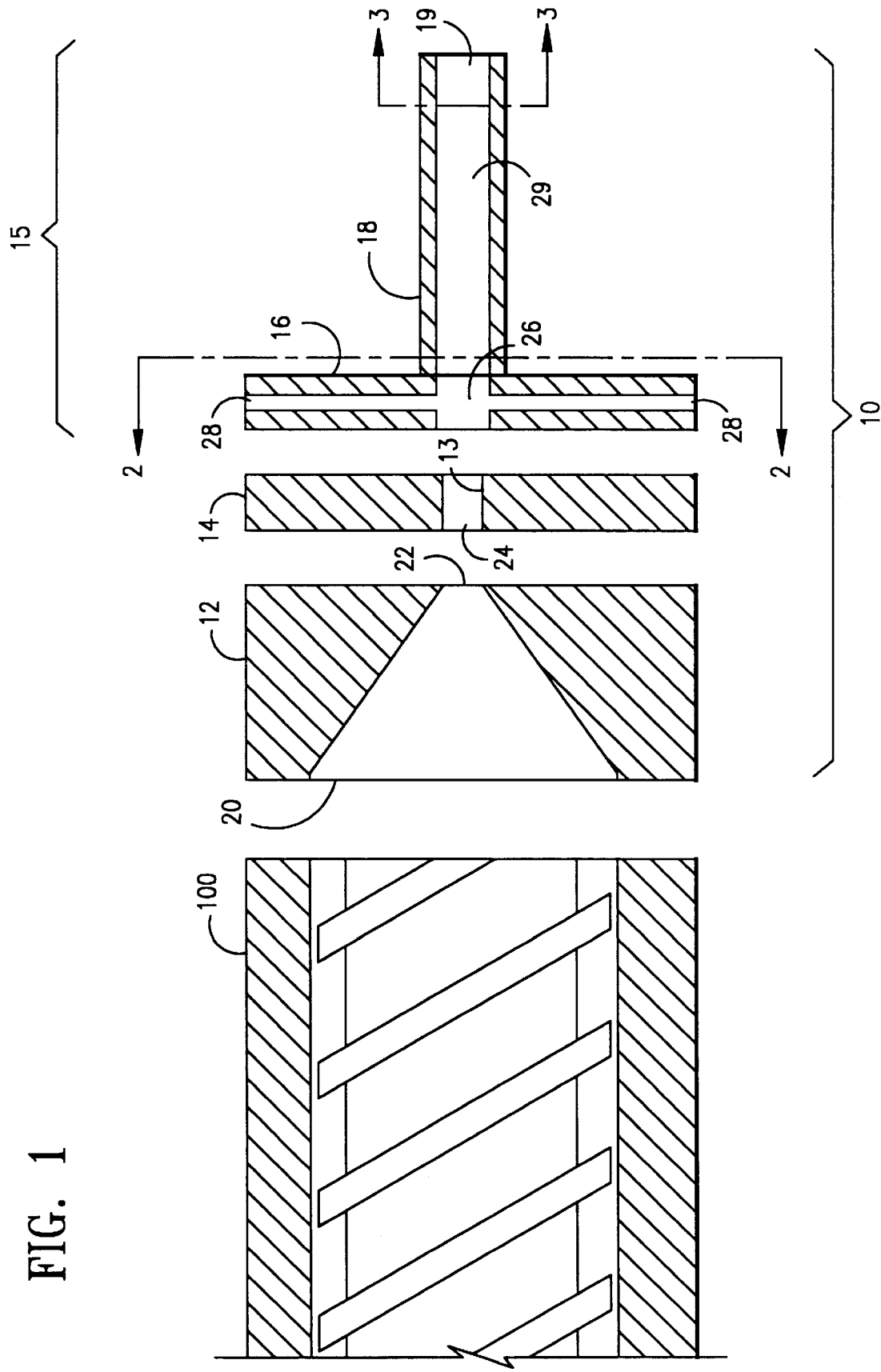
FIG. 1 is an exploded elevational section view of the die assembly of the present invention.

Referring to FIG. 1, the die assembly of the present invention is shown generally at 10 and comprises a converging die means 12, a low friction insulating land section 14, and a cooling section shown generally at 15 and comprised of a cooling medium inlet section 16 and an enclosed cooling flume 18. The die assembly is fed a wood-thermoplastic extrusion mass from an extruder 100 to the entrance end 20 of the converging die means 12. The converging die means 12 has an entrance end 20 and an exit end 22. In the converging die means 12 the extrusion mass is formed into an extrudate profile having a desired cross sectional shape. That shape can vary greatly from that of commonly used building lumber to more complex profiles such as C channels and the like. Though the converging die means is shown as a single stage in FIG. 1, the scope of the present invention includes the use of multistage dies having a plurality of stages each of which may be provided with individual temperature control. Multistage dies permit the wood-thermoplastic mass to be heated under exacting control during formation of the desired profile.

Although not pictured in FIG. 1, an exit land section may be included as an optional element of the converging die means. The land section contains a passage having substantially the same cross sectional shape as the exit end 22. The thickness of this section and accordingly the length of the passage therethrough may vary for about 0.375 in to about 1 in. For some profiles, it is believed that the exit land section reduces the abarasion wear on the insulating land section 14 described below.

Secured to the exit end 22 of the converging die means 12 or optionally to the exit land section is a low friction, insulating land section 14. The land section 14 has a passage 24 therethrough and is adapted to receive the profile from the converging die means 12. The land section passage 24 has a cross sectional shape substantially similar to that of the exit end 22 of the converging die means 12 and therefore of the extrudate profile. Unlike the converging die means, the land section passage has a constant cross sectional shape along its entire length. The surface 13 of the land section passage 24 is a low friction surface intended to minimize the amount of drag and associated shear forces generated between the extrudate and the land section 14. In a preferred embodiment the land section has a thickness. of about 9.5 to 25.4 mm (0.375 to 1 in). Particularly preferred is a thickness of about 12.7 mm (0.50 in).

The practice of the present invention includes particular selection of the material used in the land section 14 to take into account the two functions it serves. First, it provides a low friction land which it is believed helps to impart a shape memory to the extrudate profile. Second, it acts as a thermal insulator to separate the hot converging die means 12 from the much cooler cooling section comprised of the cooling medium inlet section 16 and the enclosed cooling flume 18. This thermal insulation function is significant because in the absence of the land section, the extrudate would have to be heated to an extremely high temperature to avoid becoming completely solidified and thus plugging the die assembly as soon as it exited the die and was cooled. Thus, the land section 14 is desirably constructed from a material having low thermal conductivity, high heat resistance and low coefficient of thermal expansion.

An additional desirable property of any material used in the land section is the ability to withstand the abrasive nature of the surface of a wood-thermoplastic melt. It has been found that while some materials may posses the low friction characteristic, they have a very short service life because they are quickly abraded by the coarse wood-thermoplastic melt surface. By way of example, a desirable material for use as a land passage surface coating is polytetrafluoroethylene (PTFE). PTFE has a low coefficient of friction in sliding contact with the melt of the present invention and has good thermal insulation properties. Use of this material, however, would require the frequent and uneconomical replacement of the land section. Addressing this problem, it has-been found that a PTFE composite, Fluorosint®, filled polytetraflouraethylene resin will adequately perform the land section function. Fluorosint® filled polytetraflouraethylene resin is a composite of PTFE and a synthetic mica filler which provides improved wear resistance. However, Fluorosint® is not a preferred material for this function because of its cost.

It has been found that a preferred material for the practice of the present invention is the Thermalate H320 insulation product manufactured by Haysite Reinforced Plastics. This product is a fiberglass reinforced thermoset polyester composite having the desirable properties listed above. While normally utilized solely as a mold or platen insulator, in the practice of the present invention Thermalate is put to novel use as part of an extrusion die in direct contact with the extrudate and is used to impart a desired shape to the extrudate.

It will be apparent to those of ordinary skill in the art that variations and modifications can be made to the land section 14 of the present invention. Thus, it is intended that these variations be considered part of the invention provided they come within the scope of the appended claims and their equivalents.

Figure 2:
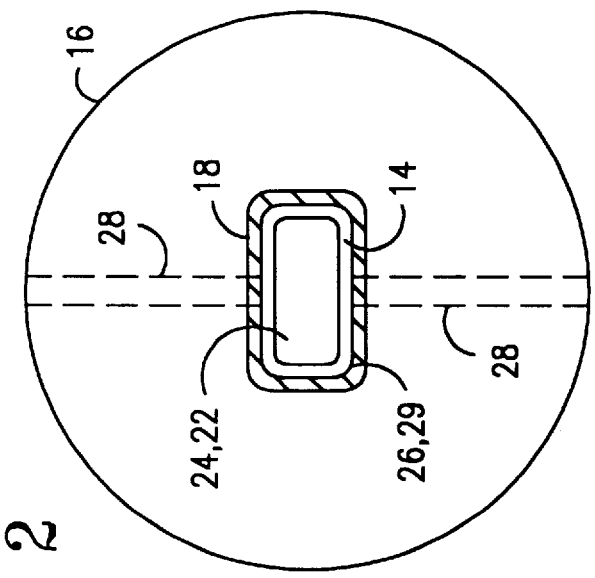
FIG. 2 is a sectional view taken through the enclosed cooling flume looking towards the water inlet section.

Referring again to FIG. 1, there is secured to the land section a the cooling section 15 which in a preferred embodiment of the present invention includes a cooling medium inlet section 16 and an enclosed cooling flume 18. The inlet section 14 has an inlet section passage 26 therethrough and is adapted to receive the profile from the land section 14. Cooling medium channels 28 are disposed within the inlet section 16 and extend radially from the inlet section passage 26 to the outside edge of inlet section. (See FIG. 2). The cooling medium channels 28 direct the flow of a cooling medium through the inlet section 16 and to the inlet section passage 26 where the medium makes direct contact with the profile, commencing the quenching step of the present invention. It should be understood that although two cooling medium channels 28 are shown in FIG. 2, additional channels may be utilized as required. For example, additional channels may be provided for a large profile or if a multi-opening die capable of extruding more than one profile simultaneously were used. It is also desirable to provide a means for controlling cooling medium flow through the channels. In the practice of this invention, the inlet section passage 26 is always flooded with whatever cooling medium may be used. It should be noted that the profile exiting the land section 14 completely fills the land section passage 24 so as to prevent flow of the cooling medium discussed herein below from the inlet section passage 26 countercurrent to the profile.

The enclosed cooling flume 18 is secured to the inlet section 16 and has a flume passage therethrough in communication with the inlet section passage. The length of the flume will vary with the size of the profile being produced and the temperatures in the converging section 12. As a non-limiting example, for the extrusion of profiles having standard U.S. building lumber sizes (5/4×6, 2×4, 2×6) a cooling flume having a length of from about 1.22 to 2.13 m (4 to 7 ft.) would be used. The flume section passage 29 has a cross sectional shape identical to and the same size as that of the inlet section passage. In this preferred embodiment, both those passages 26, 29 have the same cross sectional shape as that of the land section passage. However, each of those passages are symmetrically larger than the land section passage 24. The cooling flume passage 29 is also flooded with the cooling medium during operation of the die assembly.

Turning to FIG. 2, there is shown a sectional view taken along line 2—2 in FIG. 1. Because the land section passage 24 is smaller than the inlet section and cooling flume passages 26,29, a small portion of the land section material 14 is exposed to the inlet section passage 26 and to direct contact with the cooling medium. Thus the cooling medium will not only surround and cool the profile but will also cool the land section 14. The cooling medium travels from the inlet section passage 26 down the cooling flume 18 and exits with the profile at the flume exit 19. The cooling medium may then be recycled for later reuse. Because the cooling medium flows concurrently with the profile to be cooled, the cooling medium should desirably flow at a higher speed than that of the profile so as to create relative motion and heat transfer between the cooling medium and profile. If the cooling medium travels at the same speed or slower that the profile, the cooling medium may effectively become a thermal insulating blanket surrounding the profile. It is believed that turbulent flow provides the best heat transfer. From the time it enters the inlet section passage through most of its travel through the cooling flume, the profile is maintained in a totally airless, non-oxidizing environment completely submerged in the cooling medium.

Figure 3:
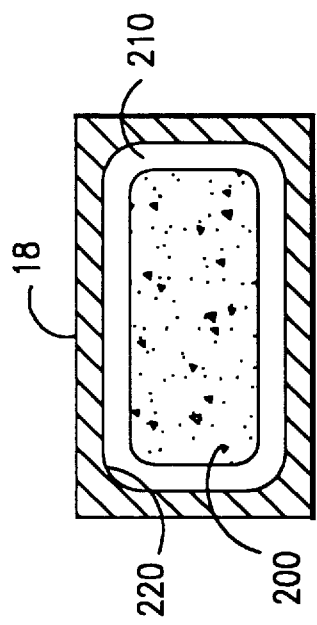
FIG. 3 is a sectional view of a preferred embodiment taken through the enclosed cooling flume looking away from the cooling medium inlet section.

FIG. 3 is a section view taken along 3—3 through the cooling flume 18 in FIG. 1. The profile 200 is centered within the cooling flume passage 29 which has a symmetrically larger shape than that of the profile. As a result an annulus 210 is defined between the cooling flume interior surface 220 and the profile 200. The annulus is flooded with the moving cooling medium which serves to support the profile 200 in the passage. In this preferred embodiment, the cooling flume passage may be sized to create an annulus having a constant width of about 3.18 mm (0.125 in) to 6.35 mm (0.25 in) in size. Depending on the size and shape of the profile 200 other annulus widths may be utilized as may be readily determined by one of ordinary skill in the art.

A particular advantage of this cooling flume arrangement is that the contact between the cooling medium and the profile takes place in a near frictionless manner. Prior art methods for cooling an extruded profile of either an all polymer or a polymer composite material typically utilize some kind of sizing die having a cooled casing. An example of this arrangement is illustrated in the '463 patent described above. The prior art methods have the disadvantage that a significant amount of back pressure can develop as a result of the high-friction, sliding contact between the profile and the walls of the sizing die. In the present invention the profile is quenched in contact with a cooling medium so as to generate essentially no back pressure and therefore essentially no friction.

Figure 5:
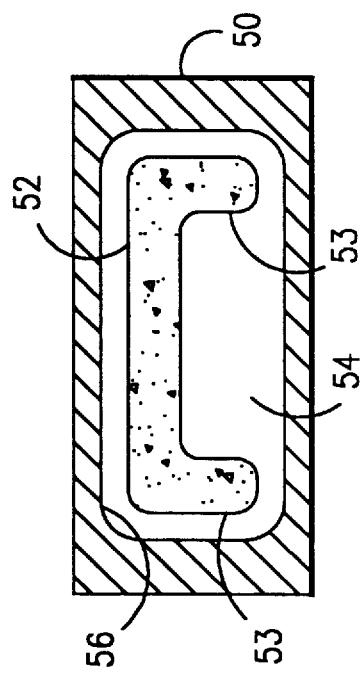
FIG. 5 is a sectional view through a cooling flume showing an alternative shape of the cooling flume passage.
Figure 4:
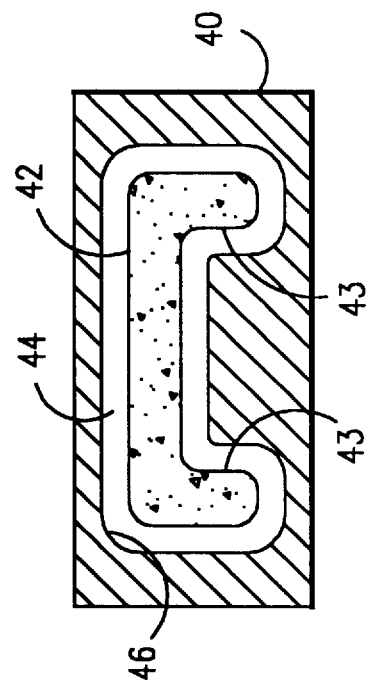
FIG. 4 is a sectional view through a cooling flume illustrating the formation of a profile having a different cross sectional shape.

The practice of the present invention also includes the extrusion of profiles having more complicated cross sectional shapes as illustrated in FIG. 4. A preferred method for extruding these more complex shapes is the use of a cooling flume interior surface 46 which matches the shape of the profile 42. Here a C-shaped annulus 44 is defined around a C-shaped profile. Each of the profile projecting members 43 are surrounded by constant width stream of cooling medium. A workable alternative, although less desirable cooling flume embodiment of the present invention is illustrated in FIG. 5. Here a C shaped profile 52 is shown positioned in a cooling flume 18 having a generally rectangularly shaped interior surface 56. The annulus formed by this embodiment does not follow the shape of the profile 52. Projecting members 53 may be subject to differential cooling due to the disparity in the size of the cooling medium streams on either side thereof. It is believed that the resultant uneven cooling even under near frictionless conditions could cause the projecting members 53 to curve inwardly or outwardly towards the sides of the cooling flume.

It should be recognized that at some point near the flume exit 19 (See FIG. 1) the profile 200 will no longer be submerged in the cooling medium. This is because in the preferred embodiment the end of the flume is open to the atmosphere. Accordingly, in order to maintain the profile submerged in the cooling medium for a given distance a somewhat longer cooling flume must be provided. Any cooling flume will therefore have an effective cooling length that is somewhat shorter than its actual length. However, using the annulus width specified above, effective cooling length should approach actual length. This characteristic of the preferred cooling flume embodiment depicted in FIG. 1 may be avoided by using the flume configuration shown in FIG. 7. There it can be seen that a collar 70 of resilient material has been fitted into the flume exit 19. The collar 70 has a passage therethrough to permit the profile 200 to pass but acts as a dam for the cooling medium 75. An outlet 72 allows the cooling medium 75 to exit the flume. In this alternative embodiment the collar 70 makes light contact with the profile so as to contain most of the cooling medium 75 in the flume 18. The collar 70 need not form a watertight seal and a small amount of leakage past the collar 70 is permissible to lubricate the profile 200. Preferably the collar 70 should be constructed of a resilient material that does not scar the profile. It is believed that the profile 200 may tend to abrade the resilient material so that the collar 70 will require periodic replacement.

Figure 7:
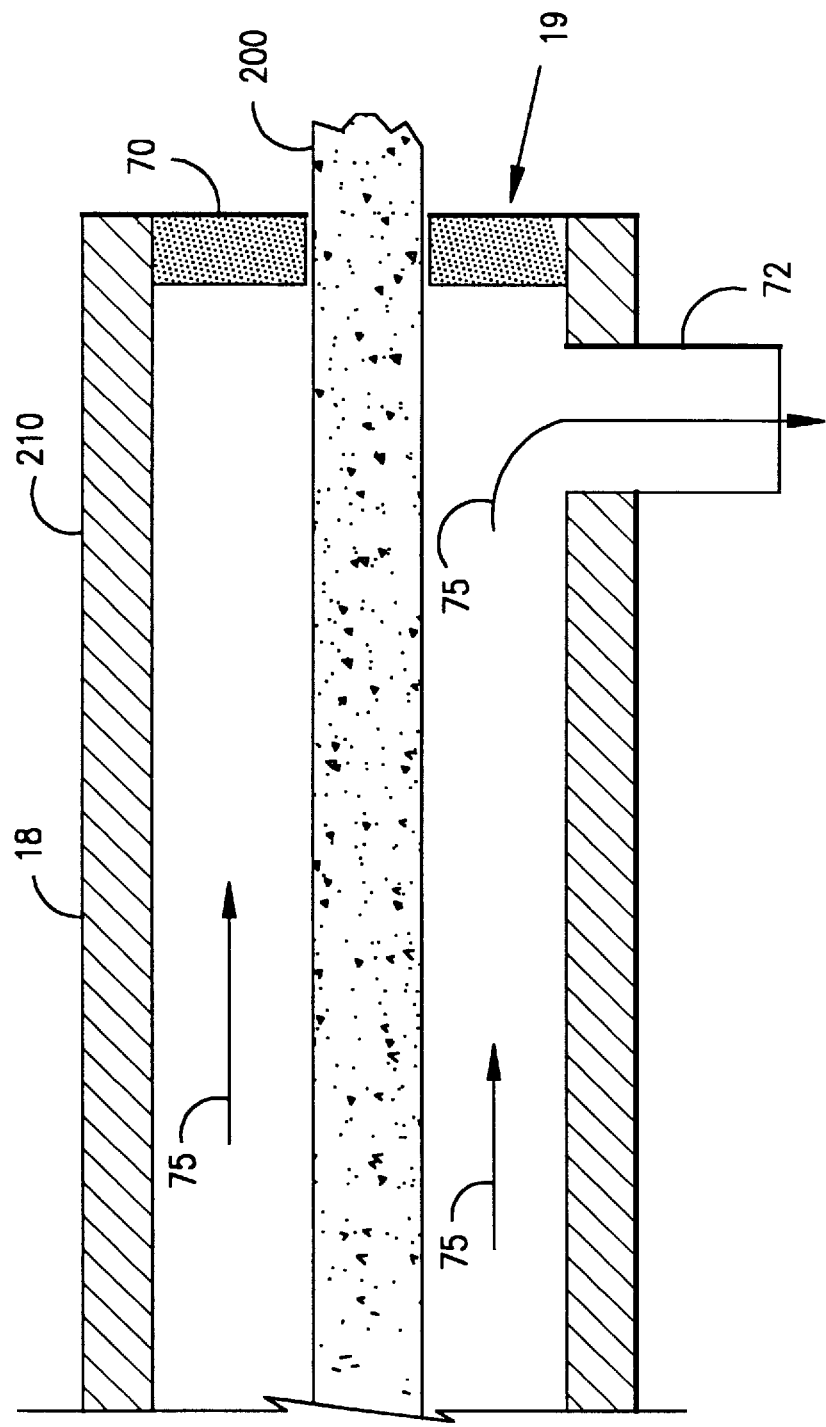
FIG. 7 is a sectional view of an alternative embodiment of the cooling flume using a collar at the cooling flume exit.

In another embodiment not pictured, the direction of cooling medium flow could be reversed so that the cooling medium enters the cooling flume 18 near the outlet 72 in FIG. 7. This embodiment provides countercurrent flow along the profile through the cooling flume passage 29 and inlet section passage 26 exiting the cooling section through the cooling medium channels 28. The countercurrent flow would provide superior heat transfer from the profile as it travels through the cooling flume. This embodiment could also utilize the collar 70 to retain cooling medium 75 in the flume 18. However, that element could be eliminated by angling the cooling flume 18 upwardly so as to retain the cooling medium therein.

Although the inlet section 16 and the cooling flume 18 are shown as separate elements in FIG. 1, they may in fact be combined into a single piece. Moreover, the cooling flume 18 may be provided in sections as a method of adjusting the flume effective cooling length and as a method of simplifying the handling of the components of the die assembly.

Figure 6:
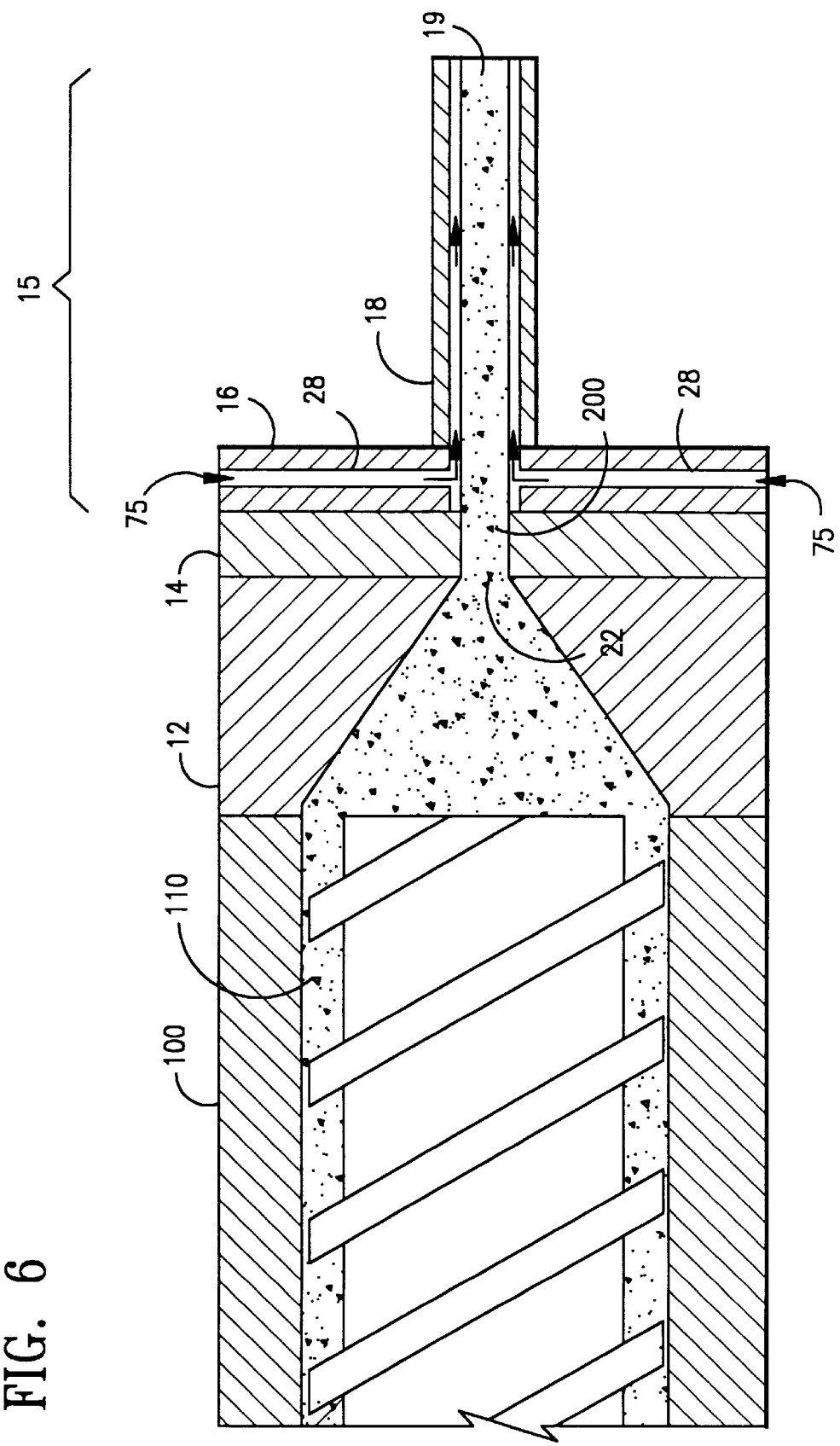
FIG. 6 is an elevational section view of the die assembly of the present invention showing the extrudate formed thereby and the path of the cooling medium.

Referring now to FIG. 6 the method of making a wood-thermoplastic composite material can be seen to include the step of forming a thermoplastic mass at a temperature above the melting temperature of the thermoplastic component; passing the mass through a converging die means to form a shaped extrudate profile having the cross sectional shape with at least a part of the die means is maintained at a substantially higher temperature than that of the mass; feeding the profile through a low friction, thermally insulating land section having the same cross sectional shape as the profile; and quenching the profile in a non-oxidizing fluid to form a substantially dimensionally stable outer shell around the profile with the shell at a temperature below the melting temperature of the thermoplastic component.

The wood-thermoplastic mass 110 is formed in the extruder 100 from a wood component and a thermoplastic component preferred sources and preparation of which are described below. The mass 110 is desirably provided at a temperature above the melting temperature of the thermoplastic component. If the thermoplastic component is not homogenous and contains sub-components having differing melting points, then the mass 110 must be provided at a temperature above the melting point of polyethylene. This may be the situation if the source of the thermoplastic component is recycled material. For reasons discussed below, a very small portion of the thermoplastic material may be unmelted.

The practice of the present invention includes providing the wood-thermoplastic mass 110 at a temperature of about 166 AC to 177 C. (330 F. to 350 F. ) at the entrance end 20 of the converging die means 12. Temperatures outside this range may be utilized depending on the nature of the thermoplastic material as determined by one of ordinary skill in the art.

The wood-thermoplastic mass 110 is next passed through a converging die means 12 where it is formed into an extrudate profile having a desired cross sectional shape. At least a part of the die means 12 is maintained at a temperature substantially higher than that of the mass 110. Desirably this high temperature point of about 232 C. to 316 C. (450 F. to 600 F.) is maintained closest to the exit end 22 of the die means 12. It is believed that forming the extrudate profile at these temperatures plasticizes the thermoplastic component to such a degree that shear stresses between the profile and the walls of the converging die means are greatly reduced. From the converging die means 12 the profile 200 is fed to an abutting, low friction, thermally insulating land section 14. The land section passage 24 has a cross sectional shape substantially similar to that of the exit end 22 of the converging die means 12. The land section 14 serves to prevent heat conduction from the hot converging die means 12 to the cooling inlet section 16 and cooling flume 18. Thus the land section permits the die means 12 to be very hot and the cooling section 15 to be very cold. It is believed that the land section imparts a cross sectional memory to the high temperature profile 200. The low friction quality of the land section passage surface 13 (See FIG. 1) addresses the tendency of the profile 200 to experience swelling as it exits any shaping or forming element by reducing the drag between the surface of the profile 200 and the surface of the land section passage 13. The materials described above for use in the land section offer very little resistance to the travel of the profile 200 therethrough.

After leaving the land section 14, the profile 200 is then quenched in a non-oxidizing environment to form a substantially dimensionally stable outer shell around the profile. In a preferred embodiment, the profile is quenched by a cooling medium 75 that is fed through the cooling medium channels 28 to the cooling section inlet passage 26. (See FIG. 1) The quenching continues as both the cooling medium 75 and the profile 200 travel through the cooling flume 18. The quenching step "freezes" the outside of the profile 200 to form a substantially dimensionally stable outer shell around the profile. The shell will have a temperature below the melting temperature of the thermoplastic component. Setting the outside of the profile 200 in this manner locks in any volatiles in the profile core. As discussed above these volatiles can consist of moisture or wood lignins which cause foaming and dimensional distortion as they attempt to escape the profile.

The quenching medium may be any fluid that does not react with either the wood component or the thermoplastic component. Preferably the quenching fluid should not cause any oxidation of the wood component and should not adhere to profile 200 in quantity after the quenching step. A sticky quenching fluid would require a costly extra step to remove the fluid from the surface of the profile 200. Ordinary tap water provided at household pressure is a preferred quenching fluid. The work of the quenching fluid is accomplished by sealing the profile from exposure to air and transferring heat away from the profile and not by any pressure exerted by the cooling medium on the profile.

It should be understood that with respect to the quenching step, the term "freezing" as used herein refers to the melting temperature of the thermoplastic component, i.e. lowering the skin temperature of the profile 200 sufficiently below the melting point of the thermoplastic component so that a hardened shell is formed. Once again if the thermoplastic component contains more than one sub-component, the quenching step must reduce the profile shell temperature to that below the lowest melting point of any of those materials. Thus the "freezing" temperature will vary with and be defined by the nature of the thermoplastic component and the profile being extruded. The core of the profile 200 will undergo some cooling during the quenching step depending on the size of the profile being extruded. It is believed that very small profiles may be frozen nearly completely from surface to core. Larger profiles may exit the cooling flume having a core temperature that is quite warm compared to the shell temperature. It has been observed that satisfactory results may be achieved with large profiles exiting the quenching step having core temperatures as high as 149 C. to 177 C. (300 F. to 350 F.).

Figure 8:
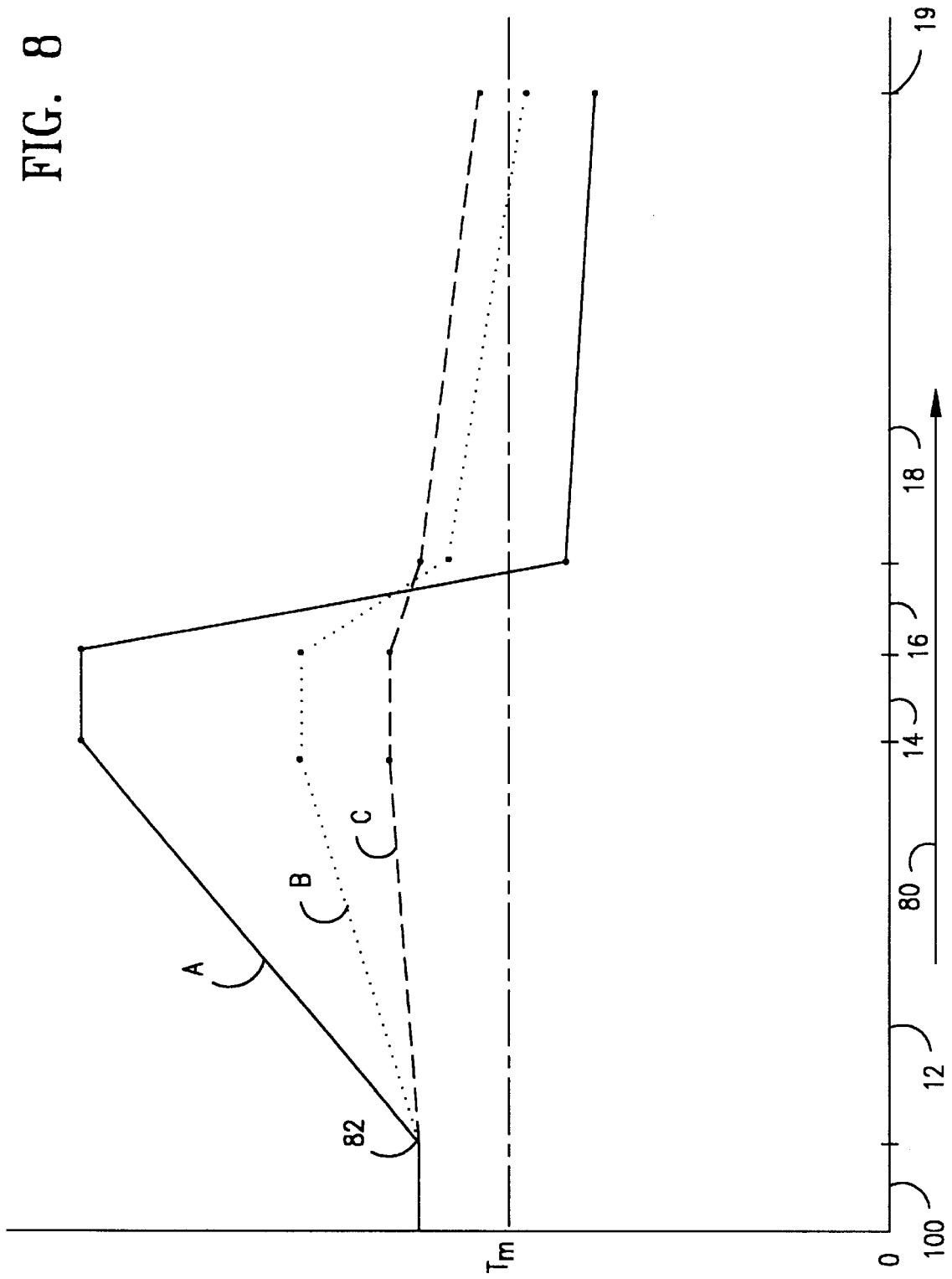
FIG. 8 is a graphical representation of the temperature histories of the skin and the core temperatures of a wood-thermoplastic profile as it travels through the die assembly of the present invention.

The essence of the present invention is illustrated in FIG. 8 which graphically illustrates a comparison of the profile skin temperature to core temperature during the practice of the present invention. The horizontal axis has been divided into sections corresponding to the elements of the die assembly of the present invention. The vertical axis represents the temperature of either the core or the skin of the profile 200 as the profile moves through the die in the direction of arrow 80. The melting temperature of the thermoplastic component, $T_m$, is shown as a horizontal reference line. Point 82 on the graph shows the temperature of the wood-thermoplastic mass at the end of the extruder barrel and the entrance end 20 of the converging die means 12. Curve A is the temperature profile of the skin region of the profile as it travels through the die assembly of the present invention. It can be seen that the skin temperature is raised above $T_m$ in the converging die means 12 and remains constant at that elevated temperature through the land section 14. At the start of the quenching process in the inlet section 16, the profile skin temperature drops very quickly below $T_m$. That process continues as the profile 200 travels through the cooling flume 18. Temperature drop in the profile core is dependent on profile size. It is believed that small profile cores see temperature history represented by curve B whereas large profiles see the temperature history represented by curve C. Compared to large profiles, small profile cores are heated to a higher temperature in the converging die means 12 and are quenched to a lower temperature in the cooling section 15. Moreover, small profile core temperatures are more likely to be at or below the melting temperature of the thermoplastic material at the exit of the cooling flume point E.

It should be understood that FIG. 8 is intended to show relative temperature relationships compared to the melting temperature of the thermoplastic component, rather than any specific temperature. Although straight lines have been shown for simplicity, the actual temperature changes may define a series of curves as opposed to a collection of straight lines.

As stated herein above the die assembly and method of the present invention are desirably practiced using a wood component and a thermoplastic component. The potential sources for the wood component are extremely varied. Sources include but are not limited to chips from a lumber yard or paper manufacturing facility. A particularly preferred source is sawdust available from furniture or pallet manufacturers. Both hardwood and soft wood sources are acceptable, however, a hardwood source is preferable. The wood component undergoes a size reduction step in a suitable means such as a hammer mill that renders the wood component to a preferable particle size of less than about 600 microns. The particle size can also be expressed in terms of the ability of the size reduced wood component to pass through a wire mesh sieve. In this case the particles should preferably pass through a size 30 mesh or smaller sieve. Prior to processing in the hammer mill the wood component is passed by a strong magnet to remove metal fragments which could cause equipment failure and result in costly repairs and downtime. Moreover, those fragments may generate sparks in the hammer mill and other areas of the production line creating a potential explosion hazard. The present invention contemplates but is not limited to the wood component leaving the hammer mill having a bulk density of about 288 to about 352 $kg/m^3$ (18 to about 22 $lbs/ft^3$). In a preferred embodiment the wood component has a bulk density of about 320 $kg/m^3$ (20 $lbs/ft^3$).

The thermoplastic component used in the present invention must be carefully selected on the basis of melting point and other physical properties. Preferably the thermoplastic component will have a melting point below about 150 C. (302 F.). The melting point of the thermoplastic material should be low enough so as not to require extrusion temperatures sufficiently high to cause degradation of the wood component. Exposing the wood component to high processing temperatures for extended periods may increase the volume of volatiles generated.

Another physical property that may be important to the selection of the thermoplastic component is melt index. Melt index is a well known parameter of thermoplastic materials and is defined as mass rate of material flow through a specified capillary under controlled conditions of temperature and pressure. Melt index is measured using the well known ASTM Method D 1238-90b, Condition 190/2.16. Typically thermoplastic materials having a low melt index have a higher molecular weight and materials having a high melt index have a low molecular weight. Materials having a relatively high melt index are generally less suitable for making a wood-thermoplastic composite because they can adversely affect final product strength and can make the extrusion process difficult to control. Preferred materials will have a melt index of 2 or less.

The practice of the present invention contemplates using a wide variety of thermoplastic materials. However, a preferred thermoplastic component is some type of polyethylene. The origin and type of polyethylene can vary from post consumer material to post industrial scrap. In all cases the thermoplastic material should be as clean, free of debris and free of organic material as practicable. Wet material is generally unacceptable due to the large amount of heat required to eliminate the excess moisture. The present invention includes the use of high density polyethylene and low density polyethylene. In a preferred embodiment, the thermoplastic component is high density polyethylene. Sources of the thermoplastic component include post consumer recycled material such as used thermoplastic grocery bags and stretch wrap film. It is also possible to use off-specification polyethylene products not suitable for sale. Other potential sources of thermoplastic material include post-consumer recycled waste that has been cleaned and reduced to pellet form and virgin thermoplastic resin.

In the event that the method of the present invention is practiced using recycled thermoplastic materials, it should be understood that occasionally a very small quantity of high melting point plastic may escape the screening step and become part of the finished product. Examples of such plastics include polyethylene terephthalate (PET), nylon and the plastic used to strap bales of recycled thermoplastic material. The presence of these kind of items in quantities not exceeding 2% to 3% by weight will not affect the method or the physical properties of the finished product provided that they are reduced to a very fine size.

The thermoplastic component is desirably screened for metal fragments that could damage equipment. This screening is typically done by hand in combination with a metal detector. The thermoplastic component is then size reduced to uniform flakes of less than about ¾ inch in size and having a relatively low bulk density. The thermoplastic component typically has a bulk density of about 48 $kg/m^3$ (3 $lbs/ft^3$) or less. However, other acceptable forms of the thermoplastic component could have a much higher bulk density. By way of non-limiting example, the bulk density of either virgin or recycled material thermoplastic pellets can be about 448 to about 560 $kg/m^3$ (28 to about 35 $lbs/ft^3$). After the size reduction step, the thermoplastic component is mixed with the wood component.

The thermoplastic component and the wood component are preferably mixed to contain from about 65 weight percent wood component to about 40 percent wood component and from about 35 percent thermoplastic component to 60 percent thermoplastic component. In a particularly preferred embodiment of the present invention, a mixture of about 52 weight percent wood component/48 weight percent thermoplastic component is used. In all cases the weight percent of the thermoplastic component should be 60 percent or less.

The novel die assembly and method for making a wood-thermoplastic composite material have many advantages over prior art processes. They permit the use of a very high temperature in the die means adjacent to a cold quenching means that forms a hardened shell around the profile. Flowing the cooling medium directly around and along the profile avoids the use of casing type devices that require sliding contact with the profile. Minimizing such sliding contact is extremely beneficial for minimizing the build up of internal stresses in the melt and drag between the melt and the walls of the casing. The present invention has the further advantage of reducing volatile components before they can cause distortion or bubbling. Dimensional stability of the final product increases as the size of the profile decreases, but for even large profiles the improvements are dramatic. The greater heat content of large profiles may be addressed by increasing the length of the enclosed cooling flume 18 and/or increasing the flow rate of the cooling medium 75.

In comparison to conventional calibration methods used for plastics extrusion, an additional advantage of the present invention is the lack of any back pressure in the cooling section 15. Typical calibration methods using a cooled casing such as that shown in FIG. 2 of the '463 patent generate a considerable amount of back pressure and frictional heat during use. The present invention includes providing the profile with a non-oxidizing, virtually friction-free environment in the cooling section 15. In the preferred embodiment, the profile is in very low friction contact with a cooling medium stream rather than the high friction, sliding contact with a casing.

The method of the present invention is also advantageous because it is very forgiving of momentary flow stoppages through the die assembly. During production it is not unusual to encounter minor flow interruptions due to, inter alia, downstream material handling problems. It has been found the present invention readily accommodates these problems without adversely affecting product quality and while avoiding creating solidly frozen "plugs" at the extruder exit.

The preferred embodiment described herein contains one passage in each die assembly component for the formation and quenching of a profile. However, for smaller profiles it is possible to have multiple passages so that more than one profile may be extruded simultaneously. Each component of the die assembly may be adapted for multiple profile extrusion.

Although the present invention has been described with preferred embodiments, it is to be understood that modifications and variations may be utilized without departing from the spirit and scope of this invention, as those skilled in the art will readily understand. Such modifications and variations are considered to be within the purview and scope of the appended claims and their equivalents.

What is claimed is:

1. A method for forming an extruded composite product containing cellulosic particles in a thermoplastic binder wherein an extrusion mass is forced through a die at an elevated extrusion temperature to form a hot shaped extrudate and cooled thereafter, said method including the steps of:

(a) heating the extrusion mass in a die means to a first temperature sufficient to decrease the shear stresses generated between the mass and the die means to form a hot shaped extrudate profile;

(b) passing the profile from the die through an intermediate temperature zone wherein the extrudate surface is thermally insulated from exterior cooling; and (c) quenching the profile directly in a non-oxidizing fluid to a second temperature thereby setting the composite surface to form the composite product.

2. The method of claim 1 wherein the quenching step (c) further includes flowing said non-oxidizing quench fluid from the quenching step concurrently along the surface of the profile.

3. The method of claim 2 wherein the quench fluid is water.

4. The method of claim 1 wherein the die means is a converging die means.

5. The method of claim 4 wherein the converging die means is composed of a plurality of stages each of the stages provided with individual temperature control.

6. The method of claim 1 wherein the die means is a multi-opening die means capable of extruding at least two profiles simultaneously.

7. The method of claim 1 wherein the quenching step (c) is accomplished by contacting the profile with the quench fluid in a cooling means, the cooling means including:

(i) a quench fluid inlet section having a passage therethrough, the passage adapted to receive the profile;

(ii) at least one quench fluid channel disposed within the inlet section, the quench fluid channel extending radially from the inlet section passage;

(iii) an enclosed flume secured to the quench fluid inlet section and having a flume passage therethrough, the flume passage having an interior surface, wherein the flume passage is in communication with the quench fluid inlet section passage; and (iv) a quench fluid annulus defined between the flume passage interior surface and the profile.

8. The method of claim 7 wherein the quenching step (c) takes place in an inlet section passage and a flume passage each having a larger and dissimilar cross-sectional shape than that of the profile exiting the low friction land section.

9. The method of claim 7 wherein the enclosed flume is comprised of at least two separable sections.

10. The method of claim 7 wherein the enclosed flume has a length of between about 4 feet to 7 feet.

11. The method of claim 7 wherein the cooling means further includes a means for controlling quench fluid flow into the cooling means.

12. The method of claim 7 wherein the enclosed cooling flume further includes a collar enclosing the profile exiting the flume and a quench fluid exit positioned upstream from the collar.

13. The method of claim 7 wherein the enclosed cooling flume further includes a collar enclosing the profile exiting the flume and a quench fluid inlet positioned upstream from the collar.

14. The method of claim 13 wherein the quench fluid flows countercurrent to the direction of the profile.

15. The method of claim 12 wherein the collar is comprised of a resilient material.

16. The method of claim 13 wherein the collar is comprised of a resilient material.

17. The method of claim 1 wherein the intermediate temperature zone is comprised of a low friction thermally insulating land section for preventing heat transfer between the heating step (a) and the quenching step (c).

18. In a method for forming an extruded composite product containing cellulosic particles in a thermoplastic binder wherein an extrusion mass is forced through a die at an elevated extrusion temperature to form a hot shaped extrudate and cooled thereafter, the improvement comprising:

(a) heating the extrusion mass in a die means to a first temperature sufficient to decrease the shear stresses generated between the mass and the die means to form a hot shaped extrudate profile;

(b) passing the profile from the die through an intermediate temperature zone wherein the extrudate surface is thermally insulated from exterior cooling; and (c) quenching the profile directly in a non-oxidizing fluid to a second temperature thereby setting the composite surface to form the composite product.

19. The method of claim 18 wherein the quenching step (c) forms a substantially dimensionally stable outer shell around the profile.

20. The method of claim 19 wherein the dimensionally stable outer shell has a temperature below the melting temperature of the thermoplastic component.

21. A method for making a dimensionally stable wood-thermoplastic composite material composed of a wood component and a thermoplastic component comprising the steps of:

(a) forming a wood-thermoplastic mass, the mass being at a temperature above melting temperature of the thermoplastic component;

(b) passing the mass through a converging die having an exit end to form a shaped extrudate profile having a cross sectional shape;

(c) feeding the profile through a low friction thermally insulating land section, the land section having substantially the same cross sectional shape as the converging die exit end; and (d) quenching the profile in a non-oxidizing environment to form a composite material.

22. The method of claim 21 wherein the quenching step (d) forms a substantially dimensionally stable outer shell around the profile.

23. The method of claim 22 wherein the dimensionally stable outer shell has a temperature below the melting temperature of the thermoplastic component.

24. The method of claim 21 wherein the quenching step (d) is accomplished by contacting the profile with a cooling medium in a cooling means, the cooling means including:

(a) a cooling medium inlet section having a passage therethrough, the passage adapted to receive the profile;

(b) at least one cooling medium channel disposed within the inlet section, the cooling medium channel extending radially from the inlet section passage;

(c) an enclosed flume secured to the cooling medium inlet section and having a flume passage therethrough, the flume passage having an interior surface, wherein the flume passage is in communication with the cooling medium inlet section passage; and (d) a cooling medium annulus defined between the flume passage interior surface and the profile.

25. The method of claim 21 wherein step (b) takes place in a converging die means composed of a plurality of stages each of the stages provided with individual temperature control.

26. The method of claim 21 wherein the converging die has multiple openings to permit the extrusion of at least two profiles simultaneously.

27. The method of claim 21 wherein the wood-thermoplastic extrudate is provided at a temperature of about 330 to 350 degrees Fahrenheit and at least one stage of the converging die means is maintained at about 450 to 600 degrees Fahrenheit.

28. The method of claim 24 wherein the quenching step (d) takes place in an inlet section passage and a flume passage each having a larger and substantially similar cross-sectional shape than that of the profile exiting the low friction land section.

29. The method of claim 24 wherein the quenching step (d) takes place in an inlet section passage and a flume passage each having a larger and dissimilar cross-sectional shape than that of the profile exiting the low friction land section.

30. The method of claim 24 wherein the enclosed flume is comprised of at least two separable sections.

31. The method of claim 24 wherein the enclosed flume has a length of between about 4 feet to 7 feet.

32. The method of claim 24 wherein the cooling means further includes a means for controlling cooling medium flow into the cooling means.

33. The method of claim 24 wherein the enclosed cooling flume further includes a collar enclosing the profile exiting the flume and a cooling medium exit positioned upstream from the collar.

34. The method of claim 24 wherein the enclosed cooling flume further includes a collar enclosing the profile exiting the flume and a cooling medium inlet positioned upstream from the collar.

35. The method of claim 34 wherein the cooling medium flows countercurrent to the direction of the profile.

36. A method for making a dimensionally stable wood-thermoplastic composite material composed of a wood component and a thermoplastic component comprising the steps of:

(a) forming a wood-thermoplastic mass, the mass being at a temperature above melting temperature of the thermoplastic component;

(b) passing the mass through converting die having an exit end to form a shaped extrudate profile having a cross sectional shape;

(c) feeding the profile through a low friction thermally insulating land section, the land section having substantially the same cross sectional shape as the converging die exit end; and (d) quenching the profile in a non-oxidizing environment to form a composite material having a substantially dimensionally stable outer shell.

37. The method of claim 34 wherein the collar is comprised of a resilient material.

38. A method for making a dimensionally stable wood-thermoplastic composite material composed of a wood component and a thermoplastic component comprising the steps of:
  (a) forming a wood-thermoplastic mass, the mass being at a temperature above melting temperature of the thermoplastic component;
  (b) passing the mass through a converging die having an exit end to form a shaped extrudate profile having a cross sectional shape;
  (c) feeding the profile through a low friction thermally insulating land section, the land section having the substantially the same cross sectional shape as the converging die exit end; and
  (d) quenching the profile in a non-oxidizing environment to form a composite material having a substantially dimensionally stable outer shell.

39. The method of claim 38 wherein the quenching step (d) forms a substantially dimensionally stable outer shell having a temperature below the melting temperature of the thermoplastic component.

40. The method of claim 38 wherein the substantially dimensionally stable outer shell extends to the core of the composite material profile.

* * * * *

UNITED STATES PATENT AND TRADEMARK OFFICE
CERTIFICATE OF CORRECTION

PATENT NO. : 5,851,469
DATED : December 22, 1998
INVENTOR(S) : John J. Muller et al.

It is certified that error appears in the above—identified patent and that said Letters Patent is hereby corrected as shown below:

In Claim 21, part (c), line 2, after the word having, delete "the".

In Claim 38, part (c), line 2, after the word having, delete "the".

Signed and Sealed this

First Day of June, 1999

Attest:

Q. TODD DICKINSON

Attesting Officer     Acting Commissioner of Patents and Trademarks

UNITED STATES PATENT AND TRADEMARK OFFICE
CERTIFICATE OF CORRECTION

PATENT NO. : 5,851,469

DATED : December 22, 1998

INVENTOR(S) : John J. Muller, et. al.

It is certified that error appears in the above-identified patent and that said Letters Patent is hereby corrected as shown below:

Title page, item [75], the third inventor, Bruce S. Yarmoska, Somerville, N.J., should be added.

Signed and Sealed this

Twenty-fourth Day of August, 1999

Attest:

Q. TODD DICKINSON

*Attesting Officer*  *Acting Commissioner of Patents and Trademarks*